Patented July 10, 1951

2,559,896

UNITED STATES PATENT OFFICE 2,559,896

PROCESS FOR PURIFYING N-METHYL-p-AMINOPHENOL

John L. Patterson, James E. Beach, and George F. Feldbauer, Jr., Rochester, N. Y., assignors to Eastman Kodak Company, Rochester, N. Y., a corporation of New Jersey No Drawing. Application August 22, 1947, Serial No. 770,188

6 Claims. (Cl. 260—574)

This invention relates to a process for purifying N-methyl-p-aminophenol.

As is known N-methyl-p-aminophenol (used in the form of its sulfate as a photographic developer), frequently contains small amounts of a skin irritant (or allergenic impurity), e. g. when the N-methyl-p-aminophenol is prepared by condensing methylamine with hydroquinone. This allergenic impurity has been found to be N,N'-dimethyl-p-phenylenediamine.

For N-methyl-p-aminophenol destined for conversion to N-methyl-p-aminophenol sulfate and use as a photographic developer, it is necessary to remove the allergenic impurity, since the skin of some people is irritated by the impurity. Various means have been proposed for removing the impurity in the past. Thus, it has been proposed to convert the N-methyl-p-aminophenol to its alkali metal salt and steam distill the salt to remove the N,N'-dimethyl-p-phenylenediamine. While this process of purification suffices to remove the phenylenediamine derivatives, the process is time consuming since a protracted steam distillation is required. It has also been proposed to make a water solution of the alkali metal salt of the N-methyl-p-aminophenol and to chill the resulting aqueous solution until N,N'-dimethyl-p-phenylenediamine separates out. The solution obtained after filtering off the solid phenylenediamine derivative contains but a very small amount of dissolved phenylenediamine derivative which can be easily removed by steam distillation or by treatment with a sorbent, such as activated charcoal. This latter process is satisfactory, but is necessarily a batch process and hence not well adapted to large scale production.

We have now found that N,N'-dimethyl-p-phenylenediamine can be removed from aqueous alkaline solutions of N-methyl-p-aminophenol by contacting the aqueous alkaline solution of the N-methyl-p-aminophenol with certain chlorinated aliphatic hydrocarbons which are liquid at 25° C. and which contain at least two carbon atoms. Our new process can be operated in a continuous manner and is well adapted to large-scale operation.

It is, of course, apparent that any water-immiscible liquid in which N,N'-dimethyl-p-phenylenediamine is soluble might suffice to extract the phenylenediamine derivative from aqueous alkaline solutions of N-methyl-p-aminophenol. However, many of such water-immiscible liquids are not of commercial value for this purpose, we have found. Thus water-immiscible liquids, such as di-n-butyl ether and n-hexyl alcohol give poor phase separation with the aqueous alkaline solution of N-methyl-p-aminophenol. n-butyl alcohol and diethyl ether are excessively miscible with water. Even certain chlorinated aliphatic hydrocarbons, e. g. propylene dichloride, give poor phase separation, thus demonstrating the unexpected aspect of our invention.

The chlorinated aliphatic hydrocarbons employed in practicing our invention are the chlorinated aliphatic hydrocarbons which are liquid at 25° C. and which contain at least two carbon atoms, e. g. 1,2-dichloroethane, 1,1,2-trichloroethane, 1,1,2-trichloroethylene, 1,1,2,2-tetrachloroethane, 1,1,2-trichloropropane. In the chlorinated aliphatic hydrocarbons which we employ, the number of chlorine atoms is at least as great as the number of carbon atoms. Thus, propylene dichloride is not within the purview of our invention.

In accordance with our invention, we contact an alkaline aqueous solution of N-methyl-p-aminophenol containing N,N'-dimethyl-p-phenylenediamine with at least one chlorinated aliphatic hydrocarbon which is liquid at 25° C., contains at least two carbon atoms and contains at least as many chlorine atoms as carbon atoms. Our process can be carried out batchwise by agitating a batch of the alkaline solution with one or more batches of the chlorinated hydrocarbon. The extractions are advantageously carried out at a pH of the alkaline solution of the N-methyl-p-aminophenol between 7 and 14. The aliphatic chlorinated hydrocarbon extract layer contains most or all of the N,N'-dimethyl-p-phenylenediamine and little, if any, of the N-methyl-p-aminophenol. The extraction can be repeated with fresh chlorinated hydrocarbon to insure a residual pure product of N-methyl-p-aminophenol in the alkaline water layer.

More advantageously, however, our process is carried out in continuous manner by running the alkaline aqueous solution containing the crude N-methyl-p-aminophenol in contact with and counter-current to the liquid aliphatic chlorinated hydrocarbon. While other methods of extraction are operable such as mixing together continuously a liquid stream of the alkaline aqueous solution of the crude N-methyl-p-aminophenol and a liquid stream of the chlorinated hydrocarbon, and allowing the mixture to flow into a tank for continuous separation and drawing off of the water layer and the extract layer, we prefer either one of two modifications, that is, to pass continuously a stream of the alkaline aqueous solution containing the crude N-methyl-p-aminophenol in finely dispersed or divided form upwardly through a column of the chlorinated hydrocarbon which is moving counter-current thereto, or, to spray or inject the heavier extractant over the surface or into the top of a column of the alkaline aqueous solution flowing in upward or counter-current direction to that of the chlorinated hydrocarbon. In the first case, the alkaline aqueous solution is the dispersed phase and the chlorinated hydrocarbon is the continuous phase, and in the second case, they are reversed in phases. In either modification of the continuous process, however, the lighter aqueous layer is drawn off continuously from the top of the liquid column, while the heavier chlorinated hydrocarbon layer is drawn off continuously from the bottom of the liquid column through any suitable overflow device. Any of the conventional type of apparatus adapted to liquid extraction of a non-miscible solution may be employed in our continuous process of extracting N,N'-dimethyl-p-phenylenediamine from alkaline aqueous solutions of crude N-methyl-p-aminophenol. Our new extraction process can be carried out batchwise or continuously at a temperature of the contacting solutions in the range of from 10° to 40° C., but preferably in the range of 20° to 30° C.

The following examples will serve to illustrate our new process.

*Example 1.—Extraction with trichloroethane*

A 50-cc. sample of alkaline aqueous solution containing approximately 25 grams of sodium salt of N-methyl-p-aminophenol and 1.37 grams of N,N-dimethyl-p-phenylenediamine was placed into an extraction funnel, after adjusting the pH of the sample to 7.5, and shaken with 50 cc. of 1,1,2-trichloroethane. The lower layer containing the 1,1,2-trichloroethane was drawn off and analyzed for N,N'-dimethyl-p-phenylenediamine. The extract was found to contain 1.28 grams of N,N'-dimethyl-p-phenylenediamine. The extraction process was repeated with a fresh 50-cc. portion of 1,1,2-trichloroethane, and this by analysis showed that 0.083 gram more of N,N'-dimethyl-p-phenylenediamine had been extracted from the aqueous solution. A third extraction with 50 cc. of fresh 1,1,2-trichloroethane resulted in the further extraction of 0.006 grams of N,N'-dimethyl-p-phenylenediamine. Analysis of the residual aqueous solution which had been extracted three times indicated that all but 0.001 gram of the N,N'-dimethyl-p-phenylenediamine contained in the original solution had been extracted.

*Example 2.—Extraction with tetrachloroethane*

A 50-cc. sample of alkaline aqueous solution containing approximately 25 grams of sodium salt of N-methyl-p-aminophenol and 1.90 grams of N,N'-dimethyl-p-phenylenediamine was adjusted to a pH of 7.5 and shaken with 50 cc. of 1,1,2,2-tetrachloroethane in a separatory funnel. The lower layer of 1,1,2,2-tetrachloroethane was drawn off and found by analysis to contain 1.87 grams of N,N'-dimethyl-p-phenylenediamine. A second extraction of the aqueous solution with a fresh 50-cc. portion of 1,1,2,2-tetrachloroethane resulted in a further extraction of 0.03 gram more of N,N'-dimethyl-p-phenylenediamine. The aqueous solution which had been twice extracted showed by analysis that only 0.003 gram of N,N'-dimethyl-p-phenylenediamine remained therein.

*Example 3.—Extraction with dichloroethane*

A 50-cc. sample of alkaline aqueous solution containing approximately 25 grams of the sodium salt of N-methyl-p-aminophenol and 2.53 grams of N,N'-dimethyl-p-phenylenediamine was adjusted to a pH of 7.5 and shaken with 50 cc. of 1,2-dichloroethane in a pear-shaped separatory funnel. The 1,2-dichloroethane layer was drawn off and analyzed and found to contain 2.30 grams of N,N'-dimethyl-p-phenylenediamine. The aqueous layer was shaken a second time with a 50-cc. portion of fresh 1,2-dichloroethane. The extract contained 0.20 gram of N,N'-dimethyl-p-phenylenediamine. The extraction was repeated a third time resulting in a further amount of 0.03 gram of N,N'-dimethyl-p-phenylenediamine being extracted from the aqueous liquor. Analysis of the latter indicated that only 0.004 gram of N,N'-dimethyl-p-phenylenediamine remained therein.

*Example 4.—Extraction with trichloroethylene*

A 50-cc. sample of the alkaline aqueous solution obtained by condensing hydroquinone with an excess of methylamine under conditions of heat and pressure, flashing off the excess of methylamine and adding sodium hydroxide to the residual solution to a pH of 7.5 was analyzed and found to contain approximately 25 grams of the sodium salt of N-methyl-p-aminophenol and 1.58 grams of N,N'-dimethyl-p-phenylenediamine. Another 50-cc. sample from the same batch was shaken with 50 cc. of 1,1,2-trichloroethylene in a separatory funnel. The lower layer of 1,1,2-trichloroethylene extract was drawn off and found by analysis to contain 1.37 grams of N,N'-dimethyl-p-phenylenediamine. The aqueous layer was extracted a second and third time with 50-cc. portions of fresh 1,1,2-trichloroethylene, the N,N'-dimethyl-p-phenylenediamine contained in the extracts being by analysis 0.165 and 0.035, respectively. The residual aqueous layer was analyzed and found to contain only 0.007 gram of N,N'-dimethyl-p-phenylenediamine.

*Example 5.—Continuous extraction with trichloroethane in continuous phase*

A batch of alkaline aqueous solution was adjusted so as to contain approximately 25 per cent by weight of the solution of sodium salt of N-methyl-p-aminophenol and approximately 1.3 per cent by weight of N,N'-dimethyl-p-phenylenediamine. This solution was fed at the rate of approximately 350 grams per minute, and at the same time 1,1,2-trichloroethane was fed at the rate of 100 grams per minute, into a glass tube held in upright position and having an inside diameter of 1½" and a length of 5 feet, and equipped with an outlet at the top and an outlet at the bottom connected with a variable overflow for regulating the height in the tube of the interface of the two liquids, the alkaline aqueous solution being fed into the tube at the bottom through a fine screen which allowed dispersion of the solution into globules, and the 1,1,2-trichloroethane being fed into the tube at the top. The alkaline aqueous solution, after emerging from the screen in the form of bubbles of approximately ⅛ inch in diameter and rising through the continuous liquid phase of 1,1,2-trichloroethane to the interface of the two liquids, maintained at a point in the upper section of the tube, overflowed through the outlet into a vented tube connected to a collecting tank for recirculation, while the heavier 1,1,2-trichloroethane was drawn off for recovery at the bottom by the outlet pipe connected to the overflow and interface regulation means, which was also vented to the atmosphere. A single passage at room temperature decreased the amount of N,N'-dimethyl-p-phenylenediamine in the alkaline aqueous solution by 40 per cent. In other words, the alkaline aqueous solution after extraction showed no loss of the sodium salt of N-methyl-p-aminophenol, but the N,N'-dimethyl-p-phenylenediamine had been reduced from 1.3 per cent by weight to 0.78 per cent by weight of the solution. To prevent oxidation, the extraction tube and tanks connected thereto were all purged with nitrogen and then maintained in an atmosphere of nitrogen during the entire procedure.

While a substantial amount of the impurity remains in the alkaline aqueous solution after a single extraction, it will be obvious that repeated passages with fresh 1,1,2-trichloroethane or employing a longer column will lower the quantity of N,N'-dimethyl-p-phenylenediamine remaining therein to merely a trace, so that the sulfate salt of N-methyl-p-aminophenol derived from the extracted aqueous liquid is for all practical purposes free from the skin irritating substance.

The alkaline aqueous solutions employed in the preceding examples can be prepared, for example, by the process of dissolving 110 parts of hydroquinone in 360 parts of water to which 4.5 parts of sodium bisulfite has been added, charging the mixture into an autoclave equipped with a mechanical stirrer and heating and chilling coils, chilling and closing the autoclave, heating to 180° C. and then injecting 140 pounds of 25 per cent (by weight) aqueous solution of methylamine at a uniform rate over a period of 3 hours, continuing heating at 180° C. for another 3 hours, then injecting 105 parts of 40 per cent (by weight) aqueous solution of sodium hydroxide, reducing pressure to atmospheric and flashing off the excess of methylamine and some water so that the concentrate of alkaline aqueous solution is approximately 400 parts.

Although specific quantities have been mentioned for the preparation of the alkaline aqueous solutions employed in the practice of our invention, it will be understood that the quantities of the various compounds can be varied over a reasonably wide range. For example, the concentration of the alkali metal hydroxide is not critical, since the amount of excess of sodium hydroxide can be varied from between 1.1 to 2.9 molecular proportion of sodium hydroxide per molecular proportion of N-methyl-p-aminophenol.

What we claim as our invention and desire to be secured by Letters Patent of the United States is:

1. In the process for preparing N-methyl-p-aminophenol by condensing methylamine with hydroquinone, wherein an alkaline aqueous solution of the sodium salt of N-methyl-p-aminophenol is obtained, the step which comprises contacting the said alkaline aqueous solution with a chlorinated aliphatic hydrocarbon selected from the group consisting of 1,2-dichloroethane, 1,1,2-trichloroethane, 1,1,2-trichloroethylene, 1,1,2,2-tetrachloroethane and 1,1,2-trichloropropane, allowing the resultant mixture of liquids to settle into two layers, and then separating the aqueous layer containing the sodium salt of N-methyl-p-aminophenol from the chlorinated aliphatic hydrocarbon layer.

2. In the process for preparing N-methyl-p-aminophenol by condensing methylamine with hydroquinone, wherein an alkaline aqueous solution of the sodium salt of N-methyl-p-aminophenol is obtained, the step which comprises contacting the said alkaline aqueous solution with 1,1,2-trichloroethane, allowing the mixture of liquids to settle into two layers, and then separating the aqueous layer containing the sodium salt of N-methyl-p-aminophenol from the 1,1,2-trichloroethane layer.

3. In the process for preparing N-methyl-p-aminophenol by condensing methylamine with hydroquinone, wherein an alkaline aqueous solution of the sodium salt of N-methyl-p-aminophenol is obtained, the step which comprises contacting the said alkaline aqueous solution with 1,1,2,2-tetrachloroethane, allowing the mixture of liquids to settle into two layers, and then separating the aqueous layer containing the sodium salt of N-methyl-p-aminophenol from the 1,1,2,2-tetrachloroethane layer.

4. In the process for preparing N-methyl-p-aminophenol by condensing methylamine with hydroquinone wherein an alkaline aqueous solution of the sodium salt of N-methyl-p-aminophenol is obtained, the step which comprises contacting the said alkaline aqueous solution with 1,2-dichloroethane, allowing the mixture of liquids to settle into two layers, and then separating the aqueous layer containing the sodium salt of N-methyl-p-aminophenol from the 1,2-dichloroethane layer.

5. In the process for preparing N-methyl-p-aminophenol by condensing methylamine with hydroquinone, wherein a alkaline aqueous solution of the sodium salt of N-methyl-p-aminophenol is obtained, the step which comprises contacting the said alkaline aqueous solution with 1,1,2-trichloroethylene, allowing the mixture of liquids to settle into two layers, and then separating the aqueous layer containing the sodium salt of N-methyl-p-aminophenol from the 1,1,2-trichloroethylene layer.

6. In the process for preparing N-methyl-p-aminophenol by condensing methylamine with hydroquinone, wherein an alkaline aqueous solution of the sodium salt of N-methyl-p-aminophenol is obtained, the step which comprises contacting the said alkaline aqueous solution with 1,1,2-trichloropropane, allowing the resultant mixture of liquids to settle into two layers, and then separating the aqueous layer containing the sodium salt of N-methyl-p-aminophenol from the 1,1,2-trichloropropane layer.

JOHN L. PATTERSON.
JAMES E. BEACH.
GEORGE F. FELDBAUER, Jr.

REFERENCES CITED

The following references are of record in the file of this patent:

UNITED STATES PATENTS

| Number | Name | Date |
|---|---|---|
| 2,090,651 | V. Bramer et al. | Aug. 24, 1937 |
| 2,249,352 | Fitch | July 15, 1941 |
| 2,286,796 | Dickins et al. | June 16, 1942 |
| 2,313,605 | Wannamaker | Mar. 9, 1943 |
| 2,358,053 | Brunings | Sept. 12, 1944 |